United States Patent
Maletzko et al.

(10) Patent No.: US 6,864,298 B2
(45) Date of Patent: Mar. 8, 2005

(54) EXPANDABLE POLYOLEFIN PARTICLES

(75) Inventors: Christian Maletzko, Altrip (DE); Uwe Keppeler, Hochdorf-Assenheim (DE); Klaus Hahn, Kirchheim (DE); Isidor de Grave, Wachenheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 10/466,479

(22) PCT Filed: Feb. 6, 2002

(86) PCT No.: PCT/EP02/01192

§ 371 (c)(1),
(2), (4) Date: Jul. 16, 2003

(87) PCT Pub. No.: WO02/062882

PCT Pub. Date: Aug. 15, 2002

(65) Prior Publication Data

US 2004/0054020 A1 Mar. 18, 2004

(30) Foreign Application Priority Data

Feb. 8, 2001 (DE) .......................... 101 05 618

(51) Int. Cl.⁷ ............................. C08J 9/224; C08J 9/228
(52) U.S. Cl. .................. 521/57; 427/220; 427/221; 427/222
(58) Field of Search .......................... 521/57; 427/220, 427/221, 222

(56) References Cited

U.S. PATENT DOCUMENTS 5,623,012 A    4/1997  Hwo

FOREIGN PATENT DOCUMENTS

DE    195 41725    5/1997
DE    199 50420    4/2001

OTHER PUBLICATIONS

BASF 51093; Preparation of Expandable Propylene—DE 100 03 021.
Polymer Beads.
60 181 139 Japan—Abstr.
58 1520 28 Japan—Abstr.
63130646—XP-002202969 Abstr.

*Primary Examiner*—Morton Foelak
(74) *Attorney, Agent, or Firm*—Keil & Weinkauf

(57) ABSTRACT

The invention relates to expandable polyolefin beads which comprise blowing agent and have been coated with from 0.01 to 3% by weight of a salt and/or ester of a long-chain fatty acid, preferably with calcium stearate, to prevent caking during foaming.

9 Claims, No Drawings

EXPANDABLE POLYOLEFIN PARTICLES

The invention relates to an expandable polyolefin bead material which has been coated with a means of preventing caking during foaming.

Increasing quantities of polyolefin foam beads are used to produce foam moldings in automotive construction, for packaging, and in the leisure sector. Expanded polypropylene foam beads (EPP) are produced industrially by impregnating polypropylene pellets with a volatile blowing agent in aqueous suspension under superatmospheric pressure and then reducing the pressure, whereupon the impregnated beads foam. Blowing agents used in industry are butane, dichlorodifluoromethane, and $CO_2$. Since these blowing agents diffuse out of the polypropylene again relatively quickly, polypropylene beads comprising blowing agent and produced in this way are considered not to be capable of storage.

German patent applications 199 50 420 and 100 03 021 have for the first time described expandable polyolefin beads comprising blowing agent and having a bulk density of more than 400 g/l which are capable of storage over a prolonged period without escape of any substantial amount of blowing agent. They can therefore be foamed to bulk densities of less than 200 g/l using superheated steam at superatmospheric pressure. DE 199 50 420 produces the beads by using an organic blowing agent, preferably pentane, to impregnate polyolefin pellets in aqueous suspension in a pressure vessel, at an elevated temperature, and cooling the mixture to below 100° C. prior to pressure reduction. DE 100 03 021 mixes polypropylene pellets with the organic blowing agent and a nucleating agent in an extruder, with extrusion and pelletization under conditions of temperature and pressure such as to avoid foaming.

It has now been found that the expandable polyolefin beads tend to cake and clump during foaming, in particular if operations are carried out at relatively high temperatures, i.e. at a high steam pressure, in order to achieve bulk densities below 100 g/l. Since the production of the expandable beads by impregnation with blowing agent in aqueous suspension always requires the addition of relatively large amounts of metal carbonates or metal phosphates as dispersing agents to prevent caking of the polyolefin pellets used within the suspension, an obvious method would have been to avoid removing these dispersing agents and to allow them to remain on the resultant expandable beads. However, metal carbonates and metal phosphates would impair the fusion of the foam beads obtained after expansion, and they would therefore have to be removed from the foam beads by complicated acid washing processes, producing wastewater in which salts are present.

It is an object of the present invention, therefore, to provide expandable polyolefin particles which do not cake during foaming and which can be fused without difficulty to give foam moldings.

We have found that this object is achieved by coating the expandable polyolefin beads with from 0.01 to 3% by weight of a salt and/or ester of a long-chain fatty acid. This coating may remain on the foam beads after expansion, since it causes no, or only very little, impairment of the fusion process to give foams.

DE-C 19541725 describes expandable styrene polymers which have been coated with a mixture of glycerol tristearate and a hydrophobic silicate to reduce water absorption.

For the purposes of the present invention, polyolefins are a) homopolypropylene,
b) random copolymers of propylene with from 0.1 to 15% by weight, preferably from 0.5 to 12% by weight, of ethylene and/or a $C_4$–$C_{10}$ α-olefin, preferably a copolymer of propylene with from 0.5 to 6% by weight of ethylene or with from 0.5 to 15% by weight of 1-butene, or a terpolymer made from propylene, from 0.5 to 6% by weight of ethylene, and from 0.5 to 6% by weight of 1-butene, or
c) a mixture of a) or b) with from 0.1 to 75% by weight, preferably from 3 to 50% by weight, of a polyolefin elastomer, e.g. an ethylene-propylene block copolymer having from 30 to 70% by weight of propylene, or
d) polyethylene (LLDPE, LDPE, MDPE, HDPE) or
e) a mixture of the polyolefins mentioned under a) to d) (or where appropriate with addition of compatibilizers).

The crystalline melting point (DSC maximum) of the polyolefins listed under a) to e) is generally from 90 to 170° C., their enthalpy of fusion, determined by DSC, is preferably from 20 to 300 J/g, and the melt flow index MFI (230° C., 2.16 kp for propylene polymers and 190° C., 2.16 kp for ethylene polymers) is preferably from 0.1 to 100 g/10 min to DIN 53 735.

Preferred polyolefins are homo- or copolymers of propylene having up to 15% by weight of ethylene and/or 1-butene, particularly preferably propylene-ethylene copolymers having from 1 to 5% by weight of ethylene. They have a melting point of from 130 to 160° C. and a density (at room temperature) of about 900 g/l.

The olefin polymer may have been blended with up to 50% of its weight of a thermoplastic of a different type and having a glass transition temperature (point of inflection in DSC curve) below 180° C. Examples of suitable thermoplastics are polyamides in amounts of from 5 to 40% by weight. Conventional compatibilizers, e.g. block copolymers, such as Exxelor P 1015 (EXXON), may be added to this mixture.

It has been found that the invention may also be worked without admixture of any thermoplastic of a different type. This is preferred insofar as the presence of a foreign thermoplastic impairs the recyclability of the polyolefin and of the foam produced therefrom. Elastomeric ethylene-propylene copolymers which may be added for plasticization are not regarded for the purposes of the present invention as being of a different type.

The polyolefin may comprise the usual additives, such as antioxidants, stabilizers, flame retardants, waxes, nucleating agents, fillers, pigments, and dyes.

The starting material for preparing the novel expandable polyolefin beads is polyolefin pellets, which preferably have average diameters of from 0.2 to 10 mm, in particular from 0.5 to 5 mm. These mostly cylindrical or round mini pellets are prepared by extruding the polyolefin, where appropriate, together with the thermoplastic to be admixed and with other additives, and, where appropriate, cooling and pelletizing.

The mini pellets should preferably comprise from 0.001 to 10% by weight of a nucleating agent, preferably from 0.1 to 5% by weight, and in particular from 0.5 to 3% by weight. Examples of those suitable are talc and/or waxes, and also carbon black, graphite, and fumed silicas. They bring about the production of a small-cell foam, and in a good many cases foaming is impossible without them.

In the preferred process for preparing the expandable beads, pellets are dispersed in a suspension medium in a stirred reactor. The preferred suspension medium is water. Suspending agents have to be added here to ensure uniform distribution of the mini pellets in the suspension medium. Suitable suspending agents are water-insoluble inorganic stabilizers, such as tricalcium phosphate, magnesium pyrophosphate, metal carbonates, and also polyvinyl alcohol and surfactants, such as sodium dodecylarylsulfonate. Amounts usually used of these are from 0.05 to 10% by weight. The addition of suspension stabilizers may be dispensed with if, as in WO-A 99/10419, the density of the suspension medium is lower than that of the suspended pellets. This is the case, for example, if the suspension medium is ethanol or a mixture of ethanol with up to 50% of water.

The boiling point of the blowing agent should be from −5 to 150° C., in particular from 25 to 125° C. The blowing agent is preferably an alkane, an alkanol, a ketone, an ether, or an ester. Particular preference is given to pentanes and hexanes, in particular sec-pentane, 3,3-dimethyl-2-butanone, and 4-methyl-2-pentanone. It is also possible to use blowing agent mixtures. The blowing agent is preferably halogen-free. However, blowing agent mixtures which comprise small amounts, preferably less than 10% by weight, in particular less than 5% by weight, of a halogen-containing blowing agent, e.g. methylene chloride or fluorohydrocarbons, should not be excluded.

The amount of the blowing agent used is preferably from 2 to 50% by weight, in particular from 5 to 30% by weight, based on the pellets. The blowing agent may be added prior to, during, or after the heating of the reactor contents. It may be introduced all at once or in portions.

During the impregnation process the temperature should be in the vicinity of the softening point of the polyolefin. It may be above the melting point (crystalline melting point) by from 40° C. to 25° C., but should preferably be below the melting point. In the case of polypropylene, preferred impregnating temperatures are from 120° C. to 160° C.

Depending on the amount and nature of the blowing agent, and also on the temperature, the pressure which becomes established in the reactor is generally above 2 bar but not above 40 bar.

The impregnation times are generally from 0.5 to 10 hours. Prior to pressure reduction and removal from the stirred reactor, the suspension is cooled below 100° C., preferably to 10–50° C., by, for example, passing cooling water through the reactor jacket. The low-solubility suspending agent is then advantageously dissolved by adding an acid. Once the pressure has been reduced and the batch discharged from the reactor, the beads comprising blowing agent are isolated from the suspension medium and washed.

In the alternate process for preparing the expandable beads, 100 parts by weight of polyolefin pellets are introduced to an extruder together with from 3 to 30 parts by weight of a volatile organic blowing agent and from 0.01 to 8, preferably from 0.1 to 5, parts by weight of a fine-particle nucleating agent, and also, where appropriate, other conventional additives, and mixed in the extruder at a temperature at which the mixture comprising blowing agent is molten, preferably from 160 to 220° C.

Examples of suitable nucleating agents are talc, polyolefin waxes, graphite powder, fumed silicas, citric esters, and also unmodified or modified bentonites. Other additives which may be used are antioxidants, stabilizers, flame retardants, fillers, and pigments. From 3 to 30, preferably from 5 to 25, parts by weight of the volatile organic blowing agent are metered in with the aid of a pump at a location along the extruder downstream. It is also possible for the nucleating agent and, where appropriate, other additives to be added together with the blowing agent at this point rather than upstream, and in this case it is advantageous for the additives to be in suspension or solution in the blowing agent.

According to the invention, to prevent foaming of the melt during discharge from the extruder, the extrusion and pelletization of the extrudate is undertaken under conditions of temperature and pressure under which practically no foaming of the pellets takes place. These conditions may vary depending on the nature of the olefin polymer, of the additives, and in particular the nature and amount of the blowing agent used. Ideal conditions may readily be determined by exploratory experiments.

A useful industrial method is underwater pelletization in a water bath which has a temperature below 100° C. and is under a pressure of more than 2 bar. The temperature must not be too low, otherwise the melt sets on the die plate, and it must not be too high, otherwise the melt expands. Increasing the boiling point of the blowing agent or reducing the amount of the blowing agent permits higher water temperatures and lower pressures to be used. In the case of the particularly preferred blowing agent sec-pentane, the ideal temperature of the water bath is from 30 to 60° C. and the water pressure is from 8 to 12 bar.

According to the invention, the expandable beads are coated with from 0.01 to 3%, preferably from 0.1 to 1.0%, based on their weight, of an anticaking agent. This process may take place in conventional mixing assemblies, e.g. in paddle mixers. Suitable anticaking agents are metal soaps, i.e. metal salts of long-chain, unbranched or branched, aliphatic or cycloaliphatic carboxylic acids (see "Metallic Soaps" by Szczepanek + Könen, Ullmann's Encyclopedia, 6th Edn., Wiley VCH), preference being given to aliphatic $C_{16}$–$C_{36}$ monocarboxylates of bi- or trivalent metals. Particular preference is given to calcium stearate. Other suitable materials are waxes and fats, i.e. ester of the long-chain carboxylic acids mentioned, preferably glycerol esters, in particular glycerol stearate. It is also possible to use mixtures of the salts and esters mentioned. Other suitable materials are amides of long-chain fatty acids. Hydrophobic anticaking agents have been found to be particularly suitable.

Besides the anticaking agents of the invention, the coating preferably also comprises from 0.01 to 0.5% by weight of antiblocking agents and/or from 0.01 to 0.3% by weight of antistats, in each case based on the beads. The antiblocking agents prevent the pulverulent anticaking agents from blocking. Examples of those suitable are fine-particle silica, talc, and bentonite. The antistats prevent the anticaking agents from becoming electrostatically charged and adhering to the wall or to the stirrer of the mixing assembly. Examples of those suitable are alkylsulfonates, alkyl sulfates, and alkyl phosphates, fatty alcohol ethoxylates, and quaternary ammonium compounds.

The beads comprising blowing agent may be foamed by conventional methods using hot air or steam in pressure prefoamers. In the case of foaming with steam, depending on the type of blowing agent and polymer matrix, and on the desired bulk density, the steam pressures used are from 2 to 4.5 bar, and the foaming times vary from 3 to 30 sec, and the temperature during foaming should be above 100° C., in the case of polypropylene in particular from 130 to 160° C. In the case of a single foaming procedure, the bulk densities achieved are below 200 g/l. It may be appropriate for technical or economic reasons to foam two or more times in order to achieve low bulk density.

The resultant foam beads may be used to produce foam moldings by known methods.

The parts and percentages mentioned in the examples are based on weight.

EXAMPLES

A. Production of Polypropylene Pellets Comprising Blowing Agent

Starting Materials:

| | |
|---|---|
| PP 1: | Novolen 3200 MC; polypropylene from Targor GmbH |
| PP 2: | Novolen 3300, polypropylene from Targor GmbH |
| Wax: | Luwax AF31; polyethylene (Mn 3000) from BASF AG |
| Talc: | Grade HF 325 |
| Carbon black: | Elftex 570 (Cabott) |
| Stab 1: | Ultranox 626 (General Electric) |
| Stab 2: | Lowinox TBM 6 (Great Lakes Chem.) |
| GTS: | Glycerol tristearate |
| GMS: | Glycerol monostearate |
| Antiblock: | Aerosil R 972; Degussa AG |
| Antistat: | Armostat 3002; Akzo Chemie GmbH |
| ZnS: | Zinc stearate |
| MgS: | Magnesium stearate |
| CaS: | Calcium stearate |
| AlS: | Aluminum distearate |
| StS: | Stearyl stearate |
| NaS: | Sodium stearate |

Production of Pellets:

Pellets G 1

100 parts of PP 1 were mixed with 1 part of talc and 0.5 part of wax and processed through a twin-screw extruder to give pellets with l:d=3:1 and weight 1.3 mg.

Pellets G 2

100 parts of PP 2 were mixed with 2 parts of carbon black, 1 part of talc, 0.5 part of wax, and 0.05 part of each of Stab 1 and Stab 2 and processed to give pellets with l:d=2.1:1 and weight 1.3 mg.

Amounts of Materials for Impregnation:

| | |
|---|---|
| Pellets: | 296.1 kg |
| Water: | 658.1 kg |
| sec-pentane | 62.2 kg |
| Calcium carbonate: | 13.3 kg (Calcilit IG; Alfa) |
| Lutensol AO 3109: | 53.3 g (BASF AG) |

Impregnation:

The starting materials were charged to a 1.36 m³ stirred vessel with cross-blade agitator and baffles. The mixture was brought to impregnation temperature (140° C. for pellets 1 and 133° C. for pellets 2) within a period of 2.5 hours and held at that temperature for 30 min, followed by cooling to room temperature and dissolution of the calcium carbonate using 18.3 liters of 65% strength nitric acid. The impregnated pellets were washed and centrifuged off from the water, and dried with the aid of a pneumatic drier. A commercially available antistat was applied immediately prior to the drying process in order to prevent any electrostatic charging. The blowing agent content was 11.0% in the pellets 1 and 10.8% in the pellets 2. The DSC had a double peak within the melting range, the high temperature peak being at 166.2° C. for the pellets 1 and at 160.8° C. for the pellets 2.

B. Preparation of Coating Compositions

The percentages given in Table 1 of the components of each of the coating compositions were mixed very intimately with one another for a number of minutes. The resultant coating compositions (B1–B10) were pulverulent with good flow properties.

TABLE 1

| | B1 | B2 | B3 | B4 | B5 | B6 | B7 | B8 | B9 | B10 |
|---|---|---|---|---|---|---|---|---|---|---|
| ZnS | 46 | | | | | | | | | |
| MgS | | 46 | | | | | | | | |
| AlS | | | 46 | | | | | | | |
| CaS | | | | 46 | 46 | | | 77 | | |
| NaS | | | | | | | | | 77 | |
| StS | | | | | | | | | | 77 |
| GMS | | | | | 40 | 77 | | | | |
| GTS | 40 | 40 | 40 | 40 | | | 77 | | | |
| Antiblock | 10 | 10 | 10 | 10 | 10 | 16 | 16 | 16 | 16 | 16 |
| Antistat | 4 | 4 | 4 | 4 | 4 | 7 | 7 | 7 | 7 | 7 |

C. Coating

The coating compositions were mixed intimately in a paddle mixer with the expandable pellets described under A, and thus applied to the pellets. The amounts given in Table 2 are parts per 100 parts of PP pellets. The mixing time was from 2–3 min.

D. Foaming and Mechanical Properties

A steam-operated pressure prefoamer as usually used in EPS processing was employed for the foaming process. The steam pressures were increased stepwise, and the steam application time was in each case 12 sec. After the foam beads had been dried screening was used to determine the extent of caking and the bulk density. Table 2 gives the maximum steam pressures at which the extent of caking remained below 1%. Tensile strength to DIN 53571 was determined for some of the specimens, as a measure of fusion quality.

The higher the maximum steam pressure which can be used, the lower the bulk density which can be achieved. The lowest bulk densities were therefore obtained using calcium stearate (Examples 6 to 8). Since different grades of polypropylene were used to reduce the pellets 1 and 2, there are differences in the achievable maximum steam pressures and the mechanical qualities of the moldings.

TABLE 2

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|
| Coating | | | | | | | | | | | | | | | |
| Pellets | G1 | G1 | G1 | G1 | G1 | G1 | G1 | G1 | G2 | G2 | G2 | G2 | G2 | G2 | G2 |
| Coating | none | B1 | B1 | B2 | B3 | B4 | B4 | B8 | B4 | B8 | B5 | B6 | B7 | B9 | B10 |
| Amount [Pts] | — | 0.5 | 0.7 | 0.5 | 0.5 | 0.5 | 0.7 | 0.3 | 0.7 | 0.2 | 0.7 | 0.3 | 0.3 | 0.3 | 0.3 |
| Foaming* | | | | | | | | | | | | | | | |
| Steam pressure [bar] | 2.3** | 2.4 | 2.6 | 3.0 | 2.9 | 3.4 | 4.0 | 4.0 | 3.5 | 3.2 | 3.3 | 2.5 | 2.1 | 2.5 | 2.1 |
| Bulk density | 222 | 182 | 121 | 82 | 90 | 65 | 53 | 53 | 54 | 65 | 52 | 72 | 78 | 107 | 91 |

TABLE 2-continued

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|
| [g/l] Mechanical properties | | | | | | | | | | | | | | | |
| Molding density [g/l] | | | | | | 77 | 79 | 58 | | | | | | | |
| Tensile strength [kPa] | | | | | | 915 | 816 | 815 | | | | | | | |

*the experiments listed are those with the maximum steam pressure where the extent of caking remained below 1%;
**in this case even at 2.3 bar the extent of caking was much greater than 1%

We claim:

1. An expandable homopolypropylene or a random copolymer of propylene with from 0.1 to 15% by weight of ethylene or a $C_4$ to $C_{10}$ olefin bead material with a bulk density of more than 400 g/l, which comprises from 1 to 40% by weight of a volatile organic blowing agent, and which has a coating material, of a salt and/or ester and/or amide of a long-chain carboxylic acid, as an anticaking agent.

2. A bead material as claimed in claim 1, wherein the anticaking agent is a salt or an ester of an aliphatic monocarboxylic acid having from 16 to 36 carbon atoms, preferably of stearic acid.

3. A bead material as claimed in claim 2, wherein the anticaking agent is a salt of a bi- or trivalent metal, preferably calcium stearate.

4. A bead material as claimed in claim 2, wherein the anticaking agent is a glycerol ester, preferably glycerol tristearate.

5. A bead material as claimed in claim 1, wherein the anticaking agent is hydrophobic.

6. A bead material as claimed in claim 1, wherein the coating also comprises from 0.01 to 0.5% by weight, based on the bead material, of an antiblocking agent.

7. A bead material as claimed in claim 1, wherein the coating also comprises from 0.01 to 0.3% by weight, based on the bead material, of an antistat.

8. An expandable polyolefin bead material as claimed in claim 1, wherein the polyolefin is a propylene polymer, preferably a copolymer of propylene with up to 15% by weight of ethylene and/or 1-butene.

9. A process for the foaming of expandable polyolefin bead material with a bulk density of more than 500 g/l, using hot air or steam, to give foam beads with a bulk density of not more than 200 g/l, which comprises using expandable polyolefin bead material with a coating comprising from 0.01 to 3% by weight, based on the bead material, of a salt, ester, or amide of an aliphatic $C_{16}$–$C_{36}$ monocarboxylic acid.

* * * * *